(12) United States Patent
Berger et al.

(10) Patent No.: US 9,076,292 B1
(45) Date of Patent: Jul. 7, 2015

(54) ENCOURAGING PLAYER SOCIALIZATION USING A NEMESIS AND AVENGER SYSTEM

(71) Applicant: BLIZZARD ENTERTAINMENT, INC., Irvine, CA (US)

(72) Inventors: Matthew Berger, Orange, CA (US); Evan Greenstone, Tustin, CA (US)

(73) Assignee: Blizzard Enterainment, Inc., Irvine, CA (US)

( * ) Notice: Subject to any disclaimer, the term of this patent is extended or adjusted under 35 U.S.C. 154(b) by 0 days.

(21) Appl. No.: 14/328,964

(22) Filed: Jul. 11, 2014

(51) Int. Cl.
A63F 13/00 (2014.01)
G07F 17/32 (2006.01)
A63F 13/40 (2014.01)

(52) U.S. Cl.
CPC ....... *G07F 17/3237* (2013.01); *A63F 2300/609* (2013.01); *A63F 13/10* (2013.01); *A63F 2300/807* (2013.01)

(58) Field of Classification Search
CPC ... A63F 13/10; A63F 13/12; A63F 2300/556; A63F 2300/609; A63F 2300/807
See application file for complete search history.

(56) References Cited

U.S. PATENT DOCUMENTS

2005/0272504 A1* 12/2005 Eguchi et al. .................. 463/40
2013/0072296 A1*  3/2013 Miyazaki et al. .............. 463/31

* cited by examiner

*Primary Examiner* — Lawrence Galka
(74) *Attorney, Agent, or Firm* — Hickman Palermo Becker Bingham LLP

(57) ABSTRACT

In an approach, one or more player characters controllable by a first player account perform an action in an instance of a game world. In the event that the action meets one or more conditions for creating a nemesis, a computer system controlling the game instance selects a second player account to be invaded by a nemesis. When the second player account plays the game in the same or a different game instance, the computer system determines whether second one or more characters of the selected account meet one or more invasion conditions. If the invasion conditions are met, the computer system generates computer-controlled enemy NPCs for second one or more characters of the second player account to defeat. If the second account defeats the nemesis invasion, rewards are generated for the first and second player accounts. Otherwise, the computer system chooses a third player account for nemesis invasion.

26 Claims, 5 Drawing Sheets

ENCOURAGING PLAYER SOCIALIZATION USING A NEMESIS AND AVENGER SYSTEM

FIELD OF THE INVENTION

The present invention relates to techniques for encouraging player socialization during play of a networked video game.

BACKGROUND

A video game is an electronic game that involves human interaction with a user interface to generate visual and/or auditory feedback on a gaming device. The gaming device may be a general purpose computing device that is programmed to execute the video game, or a special-purpose gaming machine or console.

Over the years a broad spectrum of games have been developed which span a plethora of different genres, such as role playing games, puzzle games, simulation games, shooters, and so forth. In addition, different games allow for different levels of interactions between the various human participants. A single-player game is designed to elicit input from only one player throughout the course of the gaming session. Thus, the other characters or participants that the player encounters throughout the game consist solely of non-player characters (NPCs) controlled by one or more computer systems. By sharp contrast, in a multiplayer game, the player is confronted with characters or situations controlled by human participants in addition to or instead of NPCs. However, the format and degree of interaction between the human participants can vary greatly depending on the design of the particular game being played. One critical factor in the design of multiplayer games is the scale of the multiplayer interaction.

At one end of the spectrum are games which are designed for an immense number of simultaneous players (e.g. hundreds, thousands, hundreds of thousands, or even more). Collectively, such games are referred to as massively multiplayer online (MMO) games. For example, World of Warcraft® is an example of a massively multiplayer online role playing game (MMORPG) where a participant's character(s) may team up with, fight, or otherwise interact in a virtual world with multiple other participants' characters simultaneously. MMOs often offload processing from participant devices to central servers to reduce the amount of network communications and graphics computations required by the participant devices for each additional character that is added to the environment. Furthermore many MMOs, especially MMORPGs maintain a persistent game world that is shared across all the participating players. However, in order to prevent overcrowding or interference with certain objectives within the game many MMOs also implement "dungeon instancing", which creates a copy of an area of the game world that is dedicated to a specific player or group of players. For example, cities and open areas of the game world may be shared between players, but specialized areas such as dungeons, lairs, keeps, etc. may be instantiated separately for each player or group or players and exist only as long as the area is in use by the associated players.

At the other end of the spectrum are games designed for a small number of simultaneous players. These games often also offer a solo or single-player game mode. Unlike MMOs, these games often localize processing on participant devices to maximize the quality of graphics and speed of the game. Furthermore, the limited number of players makes it more viable for network messages to be exchanged in a peer-to-peer fashion, rather than relying on a dedicated server to act as an intermediary. However, many games in this category still rely on a centralized server for authentication, saved data storage, and/or cheat prevention services. For example, in real-time strategy (RTS) games, such as Starcraft® or Warcraft®, a small number of human participants can compete simultaneously in individual game instances by collecting resources, gathering territory, constructing fortifications, building armies, and attempting to wipe out the opponents forces. These game instances are often instantiated for a particular match or round and then are reset or re-instantiated when the next match or round begins. As another example, the Diablo® series of games are action RPGs where a participant's character(s) team up with or otherwise interact in a virtual world with other participants' characters to build up their virtual characters with experience and equipment, fight monsters, and/or trade items. In many action RPGs, a player (referred to as the host) creates an instance of the game world for the other players to join and the instance persists until the host disconnects from the gaming session. However, in other implementations, a different player who is joined to the game instance is nominated as the new host, thus allowing the instance to persist until no players are left remaining.

Regardless of the scale of multiplayer interaction, multiplayer games enhance the gaming experience by stimulating the players' socially competitive and cooperative natures. For example, in MMORPGs and action RPGs players often group together to take on challenges and enemies that their own character may be ill equipped to tackle alone. As a result, players build lasting friendships or groups that play together on multiple occasions. To facilitate communication between players, multiplayer games often implement "friends lists" to which a player can add other players in order to keep track of their friends' online status and/or conveniently send messages to the added players. Furthermore, some games allow groups of players to establish "guilds" or "clans" that have access to unique features, such as a chat channel or in-game cosmetic effects that are shared between all participating members. However, most features that involve interactions between players require all participating players to be connected to the same game instance at the same time. Depending on each player's personal schedule, it may be rare for some players to find a convenient time to play together. As a result, there is a need for a mechanism that allows for the fostering of online relationships between players without necessarily requiring simultaneous play.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
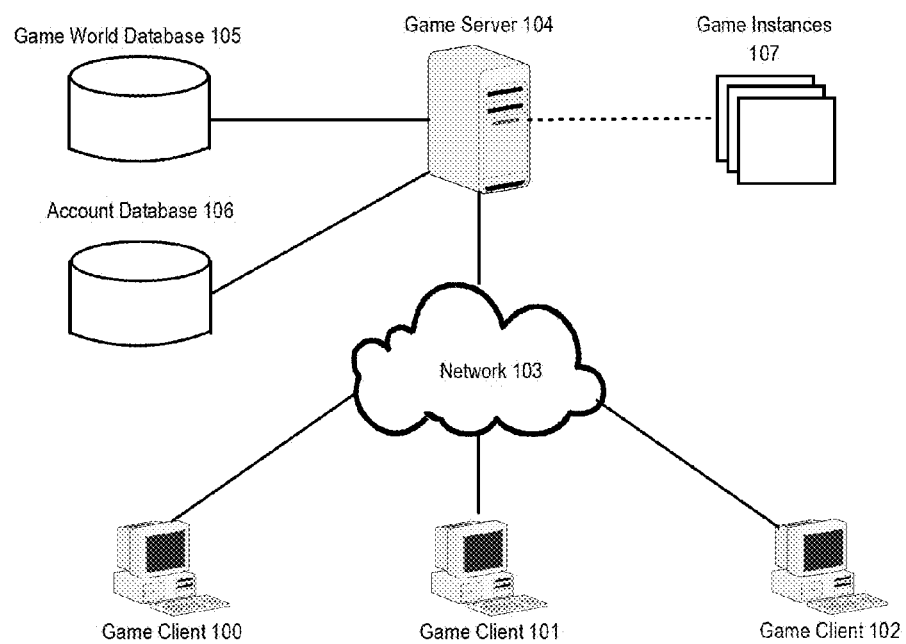
FIG. 1 illustrates an example operating environment upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Systems, methods, and stored instructions are provided herein for encouraging player socialization using a nemesis and avenger system. As mentioned above, players who are "friends" within the game may not always be simultaneously connected to the same game instance. As one example, the players may be unable to find a convenient time to simultaneously play the game. As another example, players may be completing tasks in the game that are more efficiently performed alone or with a different group of players. In addition, even if players are connected to the same game instance, the game instance may represent an immense area to where the "friends" may rarely run into each other. For example, friends whose characters are at different "levels" in the game may quest or hunt in far removed areas appropriate to their level. In traditional gaming systems, the interaction between players in different game instances or locations is minimal, such as via an in-game chat room, or non-existent. In any event, the interaction is not one that affects the actual flow or experience of the game. However, the techniques described herein provide a way for players to affect each other's gameplay at a distance or even across different game instances.

In an embodiment, one or more player characters that are controllable by a first player account perform an action in an instance of a game world. In the event that the action meets one or more conditions, a computer system controlling the game world selects a second player account to be invaded by a particular creature. A creature that is invades the game world of a second player based on actions performed by a first player is referred to herein as a "nemesis". The one or more conditions that cause the creation of a nemesis are referred to herein as "creation conditions".

When the second player account is playing the game (in the same or a different game instance), the computer system determines whether one or more "invasion conditions" are satisfied. If the invasion conditions are satisfied, the computer system generates one or more computer-controlled nemesis creatures. According to one embodiment, the nemesis creatures are generated in the vicinity of a second one or more characters of the second player account. In the event that the second account is successful in defeating the nemesis invasion, rewards are generated for the first and second player accounts. However, in the event that the second account is defeated by the nemesis invasion, a third account is selected to be invaded by the computer-controlled nemesis and the process repeats until the nemesis invasion is defeated or until a threshold number of players have been defeated.

For example, assume the creation condition is that a player be defeated by an NPC that is flagged to create a nemesis. In this example, when one or more player characters of the first player account are defeated by a computer-controlled NPC, the computer system determines whether the computer-controlled NPC is of a type that is flagged to create a nemesis. If so, the computer system selects the second player account to be invaded by a nemesis. In addition, the computer system creates nemesis data specifying the characteristics, attributes, and abilities of the nemesis. According to one embodiment, the nemesis data is based on an "upgraded" version of the computer-controlled NPC that defeated the first player. In addition, the computer system associates that nemesis data with the second account. When the second account next plays the game, the computer system may determine whether the invasion conditions are satisfied. For example, the computer system may determine that the currently logged-in characters of the second account are an appropriate character-type and at an appropriate location for a nemesis invasion.

In response to determining that the invasion conditions are satisfied, the computer system generates a nemesis, based on the nemesis data, for the characters of the second account to battle. In some cases, the nemesis may be generated with one or more "henchman" NPCs that assist the nemesis in battle against the second player. For instance, the nemesis NPC can be assisted by "shadow clones" of the players that the nemesis and/or the precursor computer-controlled NPC had previously defeated. In one embodiment, each of the "shadow clones" uses the same gear, model, abilities, names, etc. as the corresponding defeated player. If the second player account manages to defeat the nemesis invasion, the computer system generates "gift boxes" containing a variety of in-game rewards that the second player can use and/or distribute back to the first player. However, if the second player is unsuccessful in defeating the nemesis invasion, the computer system selects a third player account, modifies the nemesis data to "upgrade" the nemesis to a more powerful version, and stores the nemesis data in association with the third player account for the next invasion.

Game Worlds and Instances

As used herein, a "game world" is a template for the context in which the players experience the game. For example, the game world may define the geometric characteristics of a map in which the game takes place, the computer-controlled NPCs that appear on the map, scripted events, objects that appear in the map, dialog for the NPCs, cut-scenes, game logic, and so forth. A "game instance" is an instantiated copy of the game world that keeps track of the current context. For example, the game instance may track the current position of the player and non-player characters, current attributes of the characters (e.g. health, action points, stamina, mana, status effects, etc.), current object states, and so forth. Thus, the game world acts as a blueprint from which the gaming device generates and controls a playable copy of the game for the player to experience. As a result, different players may be playing in different "instances" of the game, but are still playing within the same "game world". In a practical environment, the "game world" and "game instances" of an electronic game may be implemented by stored data, stored instructions, specialized hardware, or combinations thereof.

Depending on the embodiment, the game world can be deterministic (causes generation of the same exact game instance each time), stochastic (generates random characteristics for the game instance), or a combination of both. For example, the game world may define that a particular area within the game always use the same tile set giving the appearance of a cave. However, the enemies populating the area, the size of the area, the objects found within that area, the number of rooms, the configuration of the rooms, the size of the rooms, and so forth, may be fully or partially randomized. Thus, different instances of the same game world may not always be generated to be exactly identical.

In some embodiments, players can save the state of a particular instance to resume again at a later time. Depending on the embodiment, the state of the instance may be completely saved, such that the context is identical to where the player left off, or partially saved, such that only particular aspects of the context are carried over from the prior gaming session. For example, the player's character and progress through the map may be saved for the next time play is resumed, but the non-player characters populating the map may be reset each time the instance is regenerated.

Example Operating Environment

FIG. 1 illustrates an example operating environment upon which an embodiment can be implemented. As shown, a game server 104 hosts game instances 107 for game client 100, game client 101, and game client 102 (collectively "the game clients") and is communicatively coupled to the game clients over network 103. In addition, the game server 104 is communicatively coupled to game world database 105, which contains data associated with generating and controlling game instances, and account database 106, which contains data associated with registered gaming accounts.

In an embodiment, the game clients and game server 104 represent one or more software components or applications executing on respective computing devices, such as personal computers, workstations, laptops, netbooks, tablet computers, game consoles, smartphones, combinations thereof, and so forth. For example, the game clients may be executing on computing devices associated with individual players of the games and the game server 104 may be executing on one or more computing devices associated with the game publisher or developer. However, in other embodiments, the game clients and the game server 104 may be implemented by specialized hardware instead of or in addition to the aforementioned software components and/or applications.

In an embodiment, network 103 represents any combination of one or more local networks, wide area networks, or internetworks. Data exchanged over the networks may be transferred using any number of network layer protocols, such as Internet Protocol (IP), Multiprotocol Label Switching (MPLS), Asynchronous Transfer Mode (ATM), Frame Relay, and so forth. Furthermore, in embodiments where the networks represent a combination of multiple sub-networks, different network layer protocols may be used at each of the underlying sub-networks.

In an embodiment, the game world database 105 and account database 106 each represent a collection of one or more storage devices. The game world database 105 stores data associated with generating and controlling game instances, such as the maps on which the game takes place, enemy NPCs, friendly NPCs, player and NPC abilities, scripted events, cut scene breakpoints, geometric characteristics of the map, objects, object interactions, and so forth. In addition, the game world database 105 stores the game logic which controls how the game reacts to various input or actions supplied by the players. The account database 106 stores data associated with one or more accounts, such as authentication information for each account, "friends" of each account, characters associated with each account, saved games associated with each account, game progress associated with each account, mail/message data for each account, pending nemesis invasion for the account, and so forth.

Although FIG. 1 depicts only a particular number of elements, a practical environment may contain hundreds or thousands of each depicted element. In addition, a practical environment may contain additional components which have been omitted from FIG. 1 to avoid obscuring the illustration. For example, the game world database 105 and account database 106 may be communicatively coupled to or accessible by the game server 104 over one or more additional networks or by network 103. In addition, other embodiments may contain a different number of databases than illustrated in FIG. 1. For example, an account established with the game server 104 may be shared among multiple games from the same developer or publisher. Thus, the data in the account database 106 may be divided into a global account database that maintains information that is shared among the multiple games and a game specific account database that stores account data unique to a particular game. For example, the global account database may keep track of the authentication information for a given account, whereas the game specific database tracks the playable characters that are accessible to the account in a particular game. Furthermore, the game server 104 may be divided into multiple game servers that are each responsible for a subset of the responsibilities for the game server 104. For example, the environment may contain an authentication server that is responsible for authenticating the game clients when an account is accessed. As another example, the game world may be divided into multiple separate areas and different game severs may be responsible for generating and maintaining instances for different areas.

Establishing a Game Instance

In an embodiment, the game clients establish a game instance with the game server 104 by "logging in" to an account and requesting an instance. The game client requesting the instance will be referred to as the "requesting game client". For example, the requesting game client may log into an account by providing one or more credentials such as passwords, account names, secret codes, authenticator codes, and so forth. The game server 104 compares the credentials to data associated with the account within the account database 106 and if a match is found the game server 104 allows access to the account. For example, the game server 104 may send information from the account database 106 to the requesting game client for display, such as characters available for play on the account, available game modes, online status of friends and/or guildmates associated with the account, and so forth. In addition, once access to the account has been granted, the requesting game client provides an option, via a user interface, widget, or other input mechanism, that allows the associated player to request a game instance. In some embodiments, the requesting game client sends additional information with the request that is used by the game server 104 to generate the game instance. For example, the account may be associated with multiple characters which can be selected by the player via a user interface provided by the requesting game client. Each of the characters available for selection may be associated with different locations in the game world, progress with various objectives, equipment, available NPCs, and so forth. Thus, the requesting game client sends with the request an identifier indicating which character will be played. This additional data allows the game server 104 to generate an instance tailored to that character. As other examples, the information sent with the request may specify an ID for a particular saved game, a particular game mode, a particular map, and various other game options which control aspects of the requested game instance.

The game server 104 responds to the request from the requesting game client by generating a game instance for the associated account based on data from the game world database 105. For example, the requesting game client may request an instance for a particular character. In response, the game server 104 looks up the specified character in the account database 106 and discovers that the character is associated with a particular area within the game world. The game server 104 then looks up the aforementioned location in the game world database 105 to discover enemy NPCs, friendly NPCs, events, map characteristics, objects, and so forth that correspond with the location to generate the instance. Depending on whether the game world is fully or partially stochastic in nature, the game server 104 may randomly select characteristics for the instance from a set of potential characteristics. For example, the game world database 105 may specify that an enemy NPC within the location may have a 30% chance to be Enemy A, a 20% chance to be Enemy B, and a 50% chance to be Enemy C.

After the game instance is generated, the game server 105 sends data back to the requesting game client that describes the game instance. In response, the requesting game client generates a user interface for the player that displays the environment and provides the player with the ability to control their playable character(s). For example, the game server 105 may send back data describing the geographic characteristics of the map, characteristics and equipment of the player, the location and type of each enemy, the location of the player, status of the player and non-player characters, objects, dialog, and so forth. The game clients then process that information into a user interface for the player. For example, the game clients may visually display the map within the vicinity of the player, render the player and non-player characters based on models correlating to the character and/or equipment types, display chat rooms or channels to communicate with other players or NPCs, render the various objects in the instance, and so forth.

Joining a Game Instance

In some embodiments, once a game instance is created for the requesting game client, the other game clients have an option to join the established instance. For example, the game clients may be configured, when not actively joined to an instance, to display a menu that lists established game instances that can be browsed and joined. As another example, the game clients may be configured to display a friends list that identifies which friends are currently in active games and provide an option to join a friend's associated instance. In one embodiment, the game client associated with an active instance provides an option that allows the game instance to be "open" or "closed". When the game instance is "open" other players are allowed to freely join the game instance. However, when the game instance is "closed" other players are not allowed to join the instance or are only allowed to join by explicit invitation by the host player of the instance.

When joining a game instance, the game clients send a message to the game server 104 specifying an identifier associated with the instance. For example, the identifier could be the name or ID of the host player or account associated with the instance. In response, the game server 104 locates the appropriate instance in the active game instances 107, and sends back data describing the current state of the game instance. In response, the game clients render the game instance in a user interface for the players in the same manner described above in the "ESTABLISHING A GAME INSTANCE" section.

In other embodiments, the game clients provide an option for players to group together prior to the instance being generated and enter the instance simultaneously. For example, the game clients may provide the ability for a host player to invite one or more other players to participate in the game. Once the host has invited the players, the game client of the host provides an option to request an instance from the game server 104. As a result of selecting the option, the game server 104 establishes the instance and automatically joins all players in the group to the instance. In other embodiments, players may be randomly assigned to the instance to meet a minimum number of players for the game. For example, in a ten player game the host may invite only three additional players, leaving the game server 104 to fill in the remaining six players.

Controlling a Game Instance

In some embodiments, the game server 104 periodically sends instance update messages to the connected game clients to keep the respective user interfaces updated with the current state of the instance. For example, depending on the rules of the game world, the instance may be updated in real-time based on the actions of computer controlled enemies, environmental triggers, or the actions of the players participating in the instance. As a result, the game instance may change even without input being supplied by every participating player. In response to receiving the update messages from the game server 104, the game clients process the update message to update the user interface to display the current state of the instance. In other embodiments, the game server 104 sends the instance update messages based on one or more conditions instead of or in addition to a periodic timer. For example, in a turn-based game the game instance may not progress until each participating player has provided input, thus rendering the periodic updates unnecessary.

In order to control the playable characters, players manipulate the user interface provided by the game clients via one or more input mechanisms. For example, the user interface may be configured to receive input via widgets displayed in the interface, mouse input, keyboard input, gamepad input, joystick input, voice controls, or any other appropriate input mechanism. In response to receiving user input to control one or more characters, the game clients convert that input into one or more messages that are sent to the game server 104. The game server 104 then manipulates the instance based on the rules provided by the game world database 105 and the player input. In some embodiments, the user interface of the client computers attempt to predict the result of the player's actions by automatically updating the user interface to a state that approximates the impact of the action on the game instance. For example, if a game client receives input to jump a character forward, the game client may render that animation before receiving input from the server that the action was successful. Due to network delay between the game clients and the game server 104, such approximations may provide a smoother gameplay experience for the players. However, in such embodiments, the user interface of the game clients is still updated with the actual state of the instance upon being updated by the game server 104. Depending on the embodiment, the game clients may implement an appropriate smoothing or anti-jitter rendering algorithm to minimize the effect of the correction.

Generating a Nemesis

Figure 2:
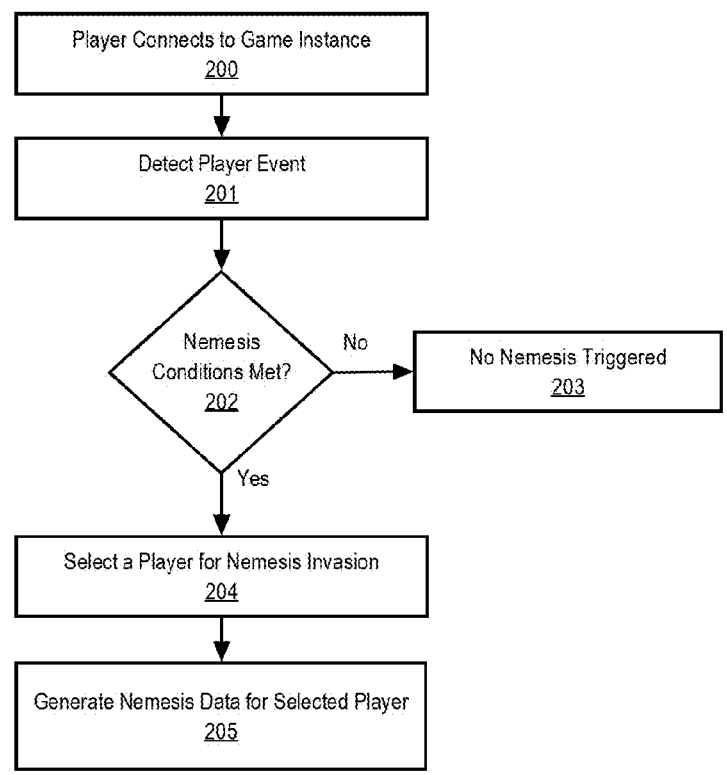
FIG. 2 illustrates a process for creating a nemesis in flow diagram form according to an embodiment.

FIG. 2 illustrates a process for generating a nemesis in block diagram form according to an embodiment. In order to illustrate clear examples, the following explanation is provided in the context of interactions between game server 104 and game client 100. However, the same process is equally applicable to the other game clients. Furthermore, the following explanation assumes that game client 100 has logged into a player account (referred to as the "active account").

At block 200, game client 100 connects to a game instance on behalf of the active account. For example, the game client 100 may connect to the game instance as a result of establishing the instance with the game server 104 as discussed above in the "ESTABLISHING A GAME INSTANCE" section. As another example, the game client 100 may connect to the game instance as a result of joining an instance requested by another player as discussed above in "JOINING A GAME INSTANCE" section.

At block 201, the game server 104 detects an event involving one or more player characters that are controllable by the game client 100. In some embodiments, the event involves an interaction between the one or more player characters and a computer-controlled NPC. For example, the interaction may be combat between the player characters and the NPC, dialog with the NPC, defeat of the NPC by the player characters, defeat of the player characters by the NPC, and so forth. In other embodiments, the event involves an interaction between the player characters and an object or area in the game instance. For example, the player characters may use a particular item, interact with a particular object, enter or leave a particular area, and so forth. In still other embodiments, the interaction may be between characters of different players, such as one player defeating another player, trade between the players, chat between the players, combat between characters of the players, and so forth.

At block 202, in response to detecting the event, the game server 104 determines whether the event meets one or more creation conditions for creating a nemesis. In some embodiments, the game world database 105 defines the conditions which are used by the game server 104 to determine whether to create a nemesis. In one embodiment, the game world database 105 defines the creation condition to be the defeat of the player characters by an NPC. In an alternative embodiment, player defeat may be only one of several creation conditions. For example, another condition may be that the defeat must be from a particular type of NPC, or under particular circumstances.

For particularly tough NPCs that are likely to result in a great number of player deaths, such as a boss encounter, the condition may be refined to prevent an undue number of nemesis invasions. For example, the creation condition may be the first defeat of the player by a particular boss, so that subsequent defeats by the same boss will not result in nemesis creation.

As yet another example, the game world database 105 may define the condition to only be met when the defeat is due to an NPC that belongs to one or more categories of nemesis-enabled NPCs. For example, the game world database 105 may define the different types to be boss NPCs and non-boss NPCs, where player character death at the hands of a boss NPC will not trigger a nemesis but player character death by a non-boss NPC will. As yet another example, the condition may be refined based on the location at which the action took place. Thus, particularity difficult locations may be exempt from triggering a nemesis.

At block 203, if the detected action did not meet the nemesis creation conditions, then the game server 104 does not trigger the creation of a nemesis. As a result, the game server 104 updates the game instance according to the rules set forth in the game world database 105 and continues as normal.

At block 204, if the detected event meets the nemesis creation conditions, then the game server 104 selects a different player account for the nemesis to invade. According to one embodiment, the game server 104 selects an account based on account selection criteria.

Account Selection Criteria

As mentioned above, when the nemesis creation conditions are met by one user, another user's account is selected based on account selection criteria. In some embodiments, the game server 104 selects the different player account based on the friend list of the player that satisfied the nemesis creation conditions. For example, the account database 106 may associate each player account with a list of other player accounts who are friends with the active account. As another example, the account database 106 may associate each player account with a clan or guild containing member players. However, in other embodiments, the game server 104 may select players from a pool of all players with accounts registered with the game server 104. In some embodiments, if the set of players associated with the active account is empty, the game server 104 instead selects the active account for invasion. As a result, even a player with an empty friends list and no clan/guild will still be able to participate in a nemesis event and become familiar with the game mechanic.

In some embodiments, the game server 104 selects the different player randomly with equal chance given to each player account in the pool of eligible player accounts. However, in other embodiments, the game server 104 may weigh accounts with certain characteristics higher than others. For example, the game server 104 may base the selection on whether the player account is connected to a live instance, how active the player account is, number of pending nemesis invasions for the account, time since the account was last invaded by a nemesis, whether the player account is connected to the same instance as the active account, and so forth. In an embodiment, metrics related to the aforementioned selection criteria is stored within the account database 106 in associated with each account. Furthermore, the game server 104 may prevent nemesis invasions for accounts with certain characteristics. For example, the game client of an account may provide an option to set a flag which is registered with the game server 104 and prevents the account from being selected for invasion. As another example, the game client may prevent the selection of players who are participating in the same instance as the active account to prevent circular invasions. However, in other embodiments, the game server 104 can still select other accounts for invasion which are participating in the same instance as the active account of the game client 100.

In some embodiments, the game server 104 selects the different player account based on the event that triggered the generation of the nemesis. For example, the game world database 105 may define an item in the game which, when used by player characters, causes a nemesis to be generated and sent after an account of the player's choosing. As another example, the characters of the active account may have access to a weapon that has a chance upon slaying an NPC to spawn a nemesis within the same game instance for the player to fight.

In some embodiments, the game client 100 provides an option to establish a nemesis group of one or more game accounts. Thus, in such embodiments, the selected account is chosen from among the players that have been established as part of the nemesis group.

The Nemesis Data

At block 205, the game server 104 generates nemesis data, for the selected player account, that describes the nemesis. In an embodiment, the game server 104 generates a nemesis record for the selected player account and associates that nemesis record with the player account in the account database 106. Each nemesis record associated with an account represents an impending invasion by a nemesis. As such, when the nemesis invasion is concluded, that record is removed from association with the player account. In an embodiment, the nemesis record specifies one or more of: abilities associated with the nemesis, a list of players defeated by the nemesis, the player that caused the initial creation of the nemesis, an identifier of a model with which to render the nemesis, character data associated with player characters defeated by the nemesis (e.g. class, sex, model, equipment, abilities, etc.), location from which the nemesis was initially created, level of the nemesis, equipment of the nemesis, attributes of the nemesis, size of the nemesis, and so forth. Depending on the exact implementation, not all of the aforementioned data may be relevant and thus some of the aforementioned data may be omitted from the nemesis record. In an embodiment, multiple nemesis records may be associated with the same account. Thus, a single account may be queued up for multiple pending nemesis invasions.

Nemesis Characteristics

In some embodiments, the nemesis is generated with one or more initial characteristics that are included in the nemesis record. In one embodiment, the initial characteristics are deterministic. For example, the nemesis may be generated with a set amount of health, a set amount of mana, a particular set of abilities, and so forth. However, in other embodiments, one or more of the nemesis characteristics are selected randomly from a range or set of characteristics. For example, the nemesis may be generated based on a certain range of health, a certain range of mana, one or more abilities selected randomly from a pool of available abilities, a randomized model, and so forth. In still other embodiments, the initial characteristics may be based on the circumstances that caused the generation of the nemesis. For example, the nemesis may be triggered by the defeat of the player at the hands of a particular NPC and the nemesis may be an "upgraded" version of the NPC. Thus, the game server 104 uses the initial characteristics of the NPC a base-line and scales those attributes higher to make the nemesis a tougher version of the NPC. Furthermore, the game server 104 may add abilities that ordinarily would not be available to the particular NPC to create the nemesis. In some embodiments, the attributes of the nemesis are scaled based on one or more characteristics of the selected account. For example, the attributes may be scaled based on an account wide level associated with the selected account. Thus, as the account's "level" increases, the attributes are scaled upwards to provide the player of the selected account with a suitable challenge. As another example, the attributes may be based on the level of the playable character(s) of the selected account.

In some embodiments, the game world database 105 defines one or more groups of abilities for the game server 104 to choose from when selecting abilities for a nemesis. Thus, the game server 104 chooses an ability group and from that point forward abilities for the nemesis are selected from the chosen ability group. Depending on the embodiment, the different ability groups may be defined such that abilities that work well together from a gameplay or aesthetic standpoint are contained within the same ability group. For example, one ability group may be representative of a "fire" nemesis ability set that includes only abilities that deal fire damage. However, another ability group may be representative of an "ice" nemesis ability set that includes only abilities that deal ice damage. In some embodiments, each of the ability sets is associated with an identifier and that identifier is included in the nemesis record. Thus, if the nemesis is further "upgraded" as a result of a future invasion, the game server 104 can use the identifier to choose additional abilities for the nemesis from the same ability group. As a result, the nemesis remains consistent with the chosen theme, even when being "upgraded" during chains of invasions against other players.

In some embodiments, the game server 104 also chooses appearance characteristics for the nemesis such as the model that will be utilized and/or modifications to a base model, such as equipment appearance, skins, textures, and so forth. For example, the NPC that triggered the generation of the nemesis may use a particular model when rendered by the game clients. The game server 104 places in the nemesis record, an identifier for the model so that the model can be reused when the nemesis invades the player. Furthermore, in some embodiments, the model may be modified to make the nemesis appear more menacing than the original NPC. For example, the model's size and color scheme may be adjusted, the equipment displayed on the model may be adjusted, and so forth. In other embodiments, the game server 104 utilizes a single model or a small group of models specific to "nemesis" NPCs. However, even for embodiments which utilize a specific nemesis model, the model may still be modified based on the circumstances that triggered the creation of the nemesis. For example, the event triggering the creation of the nemesis may take place in a location or level populated almost exclusively with murderous halberd-wielding bovines. As a result, the nemesis record may specify to modify the base nemesis model to add horns in order to represent the location from which the nemesis hails. However, in other embodiments, the game world contains no cow level.

In some embodiments, in addition to generating the nemesis data, the game server 104 also performs clean-up operations with respect to the game world. For example, after the player is defeated by an NPC, the game client 100 may display the NPC as escaping through a "nemesis portal" and the game server 104 may remove that NPC from the game instance.

Although the characteristics of the nemesis are described above as being generated at the time the nemesis record is associated with the selected player account, in other embodiments the characteristics are instead selected when the nemesis actually invades a game instance to which the selected player account is connected. Furthermore, in some embodiments, rather than associating the nemesis record with a particular account, the nemesis record is stored with a conditional selection after a particular event has been recorded by one or more other players. For example, the nemesis invasion may be queued up to trigger on the next account in the active account's friend list that connects to a game instance.

Nemesis Invasions

Figure 3:
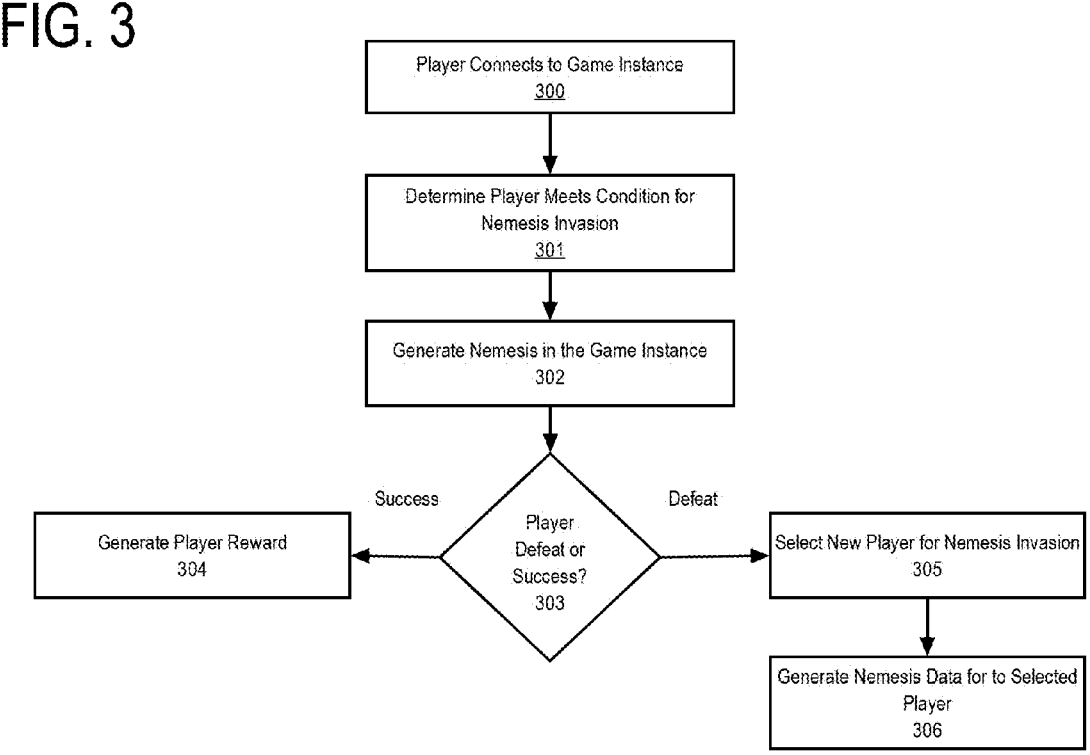
FIG. 3 illustrates a process for a nemesis invasion in flow diagram form according to an embodiment.

FIG. 3 illustrates a process for a nemesis invasion in block diagram form according to an embodiment. In order to illustrate clear examples, the following explanation is provided in the context of interactions between game server 104 and game client 101. However, the same process is equally applicable to the other game clients. Furthermore, the following explanation assumes that game client 101 has logged into a player account (referred to as the "active account").

At block 300, game client 101 connects to a game instance on behalf of the active account. For example, the game client 101 may connect to the game instance as a result of establishing the instance with the game server 104 as discussed above in the "ESTABLISHING A GAME INSTANCE" section. As another example, the game client 101 may connect to the game instance as a result of joining an instance requested by another player as discussed above in "JOINING A GAME INSTANCE" section.

At block 301, the game server 104 determines that one or more conditions are met for a nemesis invasion as defined by the game world database 105. In an embodiment, one condition is whether one or more nemesis records are associated with the active account in the account database 106. If no pending nemeses are found for the active account, then the conditions for a nemesis invasion are not met. However, even if there is at least one pending nemesis for the active account, the game world database 105 may define additional conditions that need to be met to trigger a nemesis invasion. In particular, there are some circumstances where it might be desirable to protect the player from nemesis invasions. For example, games often utilize "safe zones", such as taverns, questing hubs, and towns, where the player may exchange goods, heal their characters, obtain quests, converse with NPCs, and so forth. Since players expect some degree of safety in such areas, the game world database 105 may define locations which are off limits to nemesis invasions. As another example, there may be areas with certain scripted events, such as boss encounters, which are important to the storyline of the game that would be unduly interrupted by a nemesis invasion. As such, the game world database 105 may only consider the active account eligible for invasion only within certain areas of the game world. In some embodiments, the game server 104 stores the last time the active account received a nemesis invasion within the account database 106. In order to prevent invasions from triggering one after another in short succession, the game world database 105 may define a condition that sets a minimum time between invasions. Other examples of conditions include whether combat is currently being waged between the player character and other player or computer-controlled characters, whether a scripted event is currently progressing, the number of players connected to the game instance, and so forth.

In some embodiments, a condition for a nemesis invasion depends on a characteristic of the player character(s) currently being used in the game instance. For example, characters of the active account may be flagged as either "normal" (respawns after death) or "hardcore" (deleted after death). Since the penalty for being killed in "hardcore" mode is very punishing, the game world database 105 defines a condition for invasion as being connected to the game instance with a "normal" character. As a result, when the active account is playing with a hardcore character, that character is protected from invasions. However, if the player of that account later switches to a "normal" character, then the possibility of being invaded by a nemesis is enabled.

At block 302 the game server 104 generates a nemesis in the game instance to which the active account is connected. In an embodiment, the game server 104 generates the nemesis by modifying the game instance to include the nemesis. Thus, when the game server 104 sends the next instance update message, the game client 101 is informed of the generation of the nemesis. Depending on the embodiment, the game server 104 may insert the nemesis in the immediate vicinity of the player characters or at a more distant location to give the player additional time to react. Furthermore, the artificial intelligence (AI) of the nemesis may be configured to start a distance from the location of the player characters in an attempt to "hunt down" or play "cat and mouse" games with the player characters. For example, the nemesis may be granted increased speed and aggression towards than players compared to other hostile NPCs in game world. As another example, each hostile NPC may be associated with an "awareness area" that signifies how close player characters need to approach before the NPC will react. In addition, each NPC may also be associated with a "leash area" that signifies how far the NPC will chase the player characters before turning back or otherwise giving up on the pursuit. Depending on the embodiment, the "awareness area" and the "leash area" may be tied to a particular location in the game world or centered on the NPC. For example, in the case of the "leash area", the NPCs may give up pursuit after chasing the player characters a particular distance, the player characters leave a particular game location, after the player characters put a threshold distance between themselves and the NPC, when the NPC loses sight of the player characters due to intersecting game objects, and so forth.

In some embodiments, the nemesis has an infinite "awareness area" and "leash area". As a result, the nemesis will, regardless of its initial spawn point, hunt down the player characters constantly without the player characters being able to run, hide, or otherwise avoid the encounter. However, in some embodiments, the game server 104 is configured to abandon the nemesis invasion temporarily and restart the invasion at a future point in time in response to detecting "abandonment" conditions. For example, the player characters may reach a safe area, such as a town, where hostile NPCs are unable to enter. As another example, the player may disconnect from the game instance, such as through manually exiting the game, a game crash, loss of internet connection, and so forth. Thus, since the invasion has yet to run its full course, the game server 104 temporarily abandons the invasion for resumption at a future time. For example, the game server 104 may remove the nemesis invader from the game instance, but keep the nemesis record representing the invasion associated with the active account. Thus, once the invasion conditions are met, the active account can again be invaded by the same nemesis, effectively restarting the abandoned invasion.

In some embodiments, to give players time to react, the nemesis waits a set period of time before becoming "active". For example, the nemesis may hang back and taunt that the player is not prepared for the imminent encounter. However, for cases where the player may not be inclined to stay awhile and listen to the dialog of the nemesis, the nemesis can be activated early through a hostile action performed by the player characters.

In some embodiments, the game server 104 precedes the generation of the nemesis with one or more precursor events. The precursor events include one or more of: a change to the music being played by the game client 101, a sound effect being played that warns the player of an impending invasion, change to the environment (e.g. the ambient light being dimmed, fog rolling in, a storm starting, and so forth), taunts by the nemesis, changes to the mini-map, and so forth. For example, before actually inserting the nemesis into the game instance, the game server 104 may cause the game client 101 to display a preview model of the nemesis emerging from a portal and/or slowly becoming corporeal from a "ghostly" state. As another example, vibration-enabled controller of the player may vibrate to announce the arrival of the nemesis. In some embodiments, the precursor events are designed to free the player from other engagements so that the player characters can focus on the nemesis. For example, lightning strikes may appear that that kill off enemy players or NPCs in the immediate vicinity.

In an embodiment, the game server 104 generates the nemesis based on information contained in a nemesis record associated with the active account. For example, the nemesis record may specify the abilities of the nemesis, the attributes of the nemesis, the model to use for the nemesis, the size of the nemesis, the characters that the nemesis previously defeated, equipment for the defeated characters, and so forth. Thus, when the game server 104 inserts the nemesis into the game instance, the server computer creates the nemesis with the characteristics, attributes, and/or model specified in the nemesis record. In some embodiments, in the event that more than one nemesis record (and thus more than one nemesis invasion) is queued up for the active account, the game server 104 applies selection criteria to determine which nemesis will invade. For example, the game server 104 may select the nemesis that has killed the most player characters or the most overall number of invasions.

In some embodiments, rather than an encounter with a lone nemesis NPC, the nemesis is generated along with a number of NPC henchman assist the nemesis against the player characters. For example, the NPC henchman may be based on the location in which the invasion takes place, the location from which the nemesis was generated, a pre-set nemesis henchman character type, random selection of enemy NPC types, and so forth.

Shadow Clones

In some embodiments, the henchmen are based on the previous player characters that the nemesis (or its predecessor NPC) had defeated. For example, the nemesis may be surrounded by "shadow clones" of the defeated player characters that use the same model, abilities, attributes, and names as the defeated players. Furthermore, the defeated players may each be associated with a particular banner, portrait, or symbol that can be displayed with the associated "shadow clone" model. However, in order to prevent the encounter from being too difficult, the "shadow clones" can be set to use a reduced set of abilities and/or a scaled down set of attributes. Furthermore, to reduce the information that would need to be stored in the nemesis records, the game server 104 may utilize "archetype" models that correspond to base character attributes, such as "class" or "sex", of the defeated players to avoid the need to import over all the unique model features associated with a defeated character. In addition, the model of the "shadow clones" may be modified to differentiate the clones from regular players, such as giving the clones a shadowy or demonic appearance.

Figure 4:
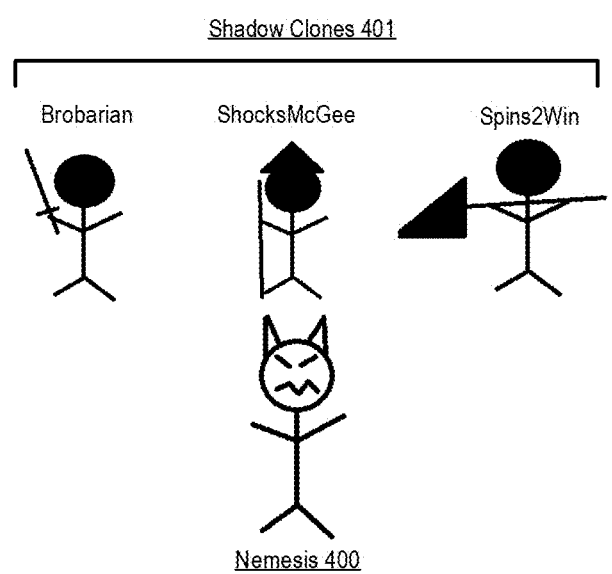
FIG. 4 illustrates a depiction of a nemesis and shadow clone henchman according to an embodiment.

FIG. 4 illustrates a depiction of the nemesis and a number of shadow clone henchman according to an embodiment. In FIG. 4, the nemesis 400 is generated in the vicinity of loyal shadow clones 401 representing the players that the nemesis had previously defeated. In this particular case, the nemesis 400 had defeated three previous players. As depicted, the appearance and name of the shadow clones 401 are based on the players that the nemesis 400 had defeated. For example, the player character corresponding to the shadow clone "ShocksMcGee" may have belonged to the "wizard" character archetype within the game. As a result, the corresponding shadow clone uses a model that depicts a wizard hat and staff. Similarly, the player character corresponding to the shadow clone "Spins2win" may be specialized in halberd-wielding skills and thus wields a halberd.

Invasion Notifications

In some embodiments, when a nemesis invasion begins, the game server 104 sends a message that causes the game clients of other players to display information about the invasion. For example, the game server 104 may select players who have been defeated by the nemesis (or its precursor NPC) to receive the message. As another example, the game server 104 may select players from the friend or guild list of the active account who are currently online to receive the message. Furthermore, in some embodiments, the game server 104 also causes an invitation to be displayed by the game clients of the other players to join the game instance and defend the player from the nemesis. In response to accepting the invitation, the game server 104 automatically joins the participating player accounts to the instance.

Invasion Outcome

At block 303, the game server 104 determines whether or not the player characters succeeded against the invasion. In an embodiment, the success conditions includes one or more of: the player characters killing the invading forces, the player characters completing one or more objectives while the nemesis invasion is ongoing, the player characters surviving a set period of time, and so forth. In an embodiment, the defeat conditions include: death of the player characters by the invading forces, death of one or more particular player characters, death of one or more player characters of the host, failure of one or more objectives, failure to defeat the invasion within a time limit, and so forth.

In some embodiments, the difficulty of the nemesis and/or the henchmen is scaled based on characteristics, such as level, of the character(s) being invaded. Thus, for example, even though a "high level" character caused the initial generation of the nemesis, a "low level" player being invaded by the nemesis has a fighting chance to succeed against the invasion. If there are multiple players connected to the same game instance, the invasion may also be scaled based on the number of players. Thus, the attributes and/or abilities of the NPC invaders may be increased for each additional player participating in the instance.

At block 304, if the player characters meet the success condition, the game server 104 generates one or more player rewards. In an embodiment, the one or more player rewards include both rewards for the active account and/or rewards for the accounts associated with the players defeated by the nemesis. For example, upon defeating the nemesis, the game server 104 may generate in-game currency, equipment, consumable items, experience, cosmetic items, and so forth for the characters of the active account. Additionally, the game server 104 may generate the same or similar types of items for all or a subset of the players previously defeated by the nemesis. In some embodiments, the items for the defeated players automatically appear in the inventory of the players' characters, a bank vault or stash box associated with the accounts of the defeated players, or are mailed for pickup at a "mail box" or other equivalent in-game object. However, in other embodiments, the items for the defeated players are instead picked up by the player of the active account, who then trades, mails, or otherwise gives the items to the associated defeated players. For example, the game server 104 may drop within the game instance "gift boxes" filled with a random assortment of items and bound to specific defeated player accounts. The player of the active account is then responsible for distributing the "gift boxes" to the appropriate players to encourage a sense of community within the game. In some embodiments, the "gift boxes" generate items appropriate to the character that opens the box. For example, if a character that specializes in sword combat opens the box, the probability of a sword being generated from the box is increased or guaranteed. In addition, some embodiments assign the gift box to be "account bound" and therefor sharable between different characters of the same account. Thus, even though the player's "barbarian" class character participated in the nemesis encounter, the player may instead open the box with their "wizard" class character to get appropriate "wizard items". In some embodiments, when the nemesis is defeated, the game server 104 causes the defeated players to receive a message informing the defeated players that they have been avenged and identifying the player or players who defeated the nemesis. In some embodiments, the rewards generated for defeating the nemesis are scaled based on characteristics of the nemesis. For example, the rewards may be scaled based on the number of players that the nemesis had defeated.

In some embodiments, when the nemesis is defeated, the nemesis record associated with the active account in the account database 106 is removed to prevent the nemesis from being regenerated in another invasion. However, in other embodiments, the nemesis record may be modified and/or recycled. For example, after a first defeat the attributes of the nemesis may be modified and the model changed to an "undead" or "zombified" version of the nemesis to re-invade again at a future point in time. In addition, when the nemesis re-invades various aspects of the invasion, such as the precursor events, may be modified. For example, the resurrected nemesis may exclaim that its previous defeat was merely a setback before commencing hostile actions against the player characters. In other embodiments, the "zombified" version of the nemesis may instead invade another player account, such as one of the previously defeated player accounts, rather than the active account.

At block 305, if the player characters meet the defeat condition, the game server 104 selects a new player account for nemesis invasion. In an embodiment, the game server 104 selects the new player account for nemesis invasion according to the same techniques discussed above in the "GENERATING A NEMESIS INVASION" section. However, in some embodiments, the game server 104 prevents the selection of players who have already been defeated by the nemesis.

At block 306, the game server 104 generates nemesis data for the selected player account that describes the nemesis. In some embodiments, the game server 104 generates the nemesis data according to the same techniques described above in the "GENERATING A NEMESIS INVASION" section. However, in other embodiments, the nemesis data is generated based on the nemesis that triggered the present invasion. For example, the nemesis for the new player may be an "upgraded" version of the previous nemesis. Thus, as more players fall victim to the nemesis, the nemesis becomes more and more powerful. As a result, the game server 104 may start with the characteristics of the invading nemesis and scale those characteristics based on the number of defeated players. For example, the nemesis might be granted an additional ability randomly selected from a set of potential abilities for every defeated player up to a cap number of abilities. In embodiments which include an ability group identifier in the associated nemesis record, the additional ability or abilities may be selected from the identified ability group. Furthermore, the health, damage, model size, or other attributes of the nemesis may increase with each defeated player. In an embodiment, the game server 104 locates the current nemesis record for the invasion associated with the active account, modifies the attributes of the nemesis, adds the current active account to the list of defeated players, stores a new nemesis record within the account database 106 in association with the selected new player account, and removes the nemesis record associated with the current active account that corresponded to the invasion. As a result, the selected new player account is flagged to be invaded by the improved nemesis.

In some embodiments, if the nemesis reaches a threshold number of player kills, the nemesis "retires" and the game server 104 does not select a new player for invasion. In embodiments where the nemesis grows more powerful after each player kill, retirement prevents the nemesis from becoming so powerful that players do not have a reasonable chance to succeed against the invasion. However, in other embodiments, when a nemesis "retires" a special boss fight is unlocked for the player to defeat. For example, upon the nemesis "retiring" a previously inaccessible game area may become available which houses a "boss nemesis". The 'boss nemesis" may possess one or more unique abilities and provide one or more unique rewards to the player or players who defeat the encounter. Furthermore, depending on the embodiment, the "boss nemesis" may also be assisted by shadow clone henchman representing the previously defeated players in the same manner as the nemesis invasion. In some embodiments, the game clients provide a mechanism that allows players to "invite" or "summon in" other players on their friends or clan list to participate in the "boss nemesis" encounter. In one embodiment, the players that can be summoned in are limited to the players who have been previously defeated by the nemesis. As a result, those players who had previously tasted their own fear during the nemesis invasions are granted an opportunity to band together and exact revenge. However, in other embodiments, rather than relying on one player to "invite" the others, the game server 104 instead automatically invites any of the previously defeated players who are online or otherwise available to participate in the "boss nemesis" encounter. In other embodiments, the "boss nemesis" may be accessed in ways which do not require the nemesis to "retire". For example, upon defeating a nemesis, players may be rewarded with a special item that allows the "boss nemesis" to be accessed. However, in other cases, the players may need to collect a threshold number of items from defeated nemeses to unlock the "boss nemesis".

Peer-to-Peer Embodiments

In the embodiment depicted by FIG. 2 the game server 104 maintains the game instances and coordinates the input supplied by the game clients. However, in another embodiment, the operating environment is based on a peer-to-peer model rather than a client-server model. In such an embodiment, each of the game clients incorporates aspects of both a client and a server. For example, each of the game clients may have access to a copy of the game world database 105 and is capable of generating their own instances of the game world. Thus, a player associated with a game client can cause the game client to generate a game instance to which themselves or other players can connect to play the game. As a result, it is the responsibility of the game client hosting the game instance to initialize the game instance and coordinate the progression of the game between the participating players. Since the peer-to-peer model does not rely on a centralized server, each of the game clients maintains their own database to store information related to nemesis invasions. When one game client generates an invasion, the nemesis data describing the invasion is forwarded to the game client of the player selected for invasion. Thus, when the game client of the selected player generates an instance for that player, the game client generates invasions based on the received nemesis data. Furthermore, in some embodiments, when the game client of the selected player connects to a game instance hosted by another game client, the game client of the selected player sends the nemesis data to the other game client so that the other game client can generate nemesis invasions for the selected player during the gaming session.

Same Instance Embodiments

In the embodiment depicted by FIG. 2 the game server 104 maintains separate game instances for individuals or groups of players. However, some game types (in particular MMORPGs) have the tendency is to either maintain one comprehensive persistent world and/or create individual instances only for a relatively small portion of the game's content. However, the game world may be extremely large to where friends or guildmates participating within the same "instantiation" of the game world, but different locations, may rarely run into each other. As a result, similar to how players participating within different game instances or playing at different times may lack social interaction, the same holds true for players participating in the same instance but at different locations within the game world. Thus, the nemesis creation and invasion processes depicted by FIG. 2 and FIG. 3 respectively may occur within the same game instance. For example, a first player being killed by an NPC at one location within the game instance may trigger a nemesis invasion to be generated for a second player at another location within the game instance. Thus, there is no requirement to the techniques described herein that the player triggering the invasion and the player being invaded must reside on different game instances.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
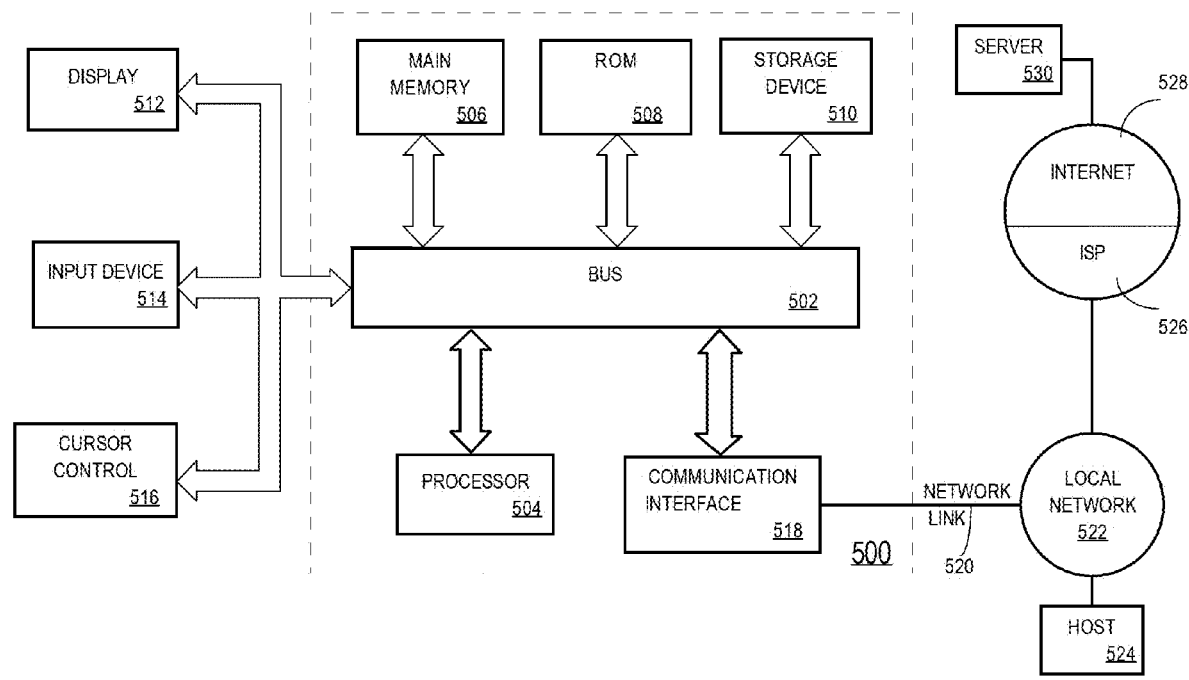
FIG. 5 illustrates an example computer system for performing various machine-implemented steps described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   detecting that a particular event has occurred within a first game instance;
   wherein the particular event involves:
      first one or more player characters that are controllable by a first account, and
      a particular computer-controlled character,
   wherein the particular computer-controlled character has abilities that enable the particular computer-controlled character to perform a first set of actions when interacting with the first one or more player characters in the first game instance;
   in response to detecting that the particular event has occurred, performing steps of:
      selecting a second account from one or more accounts, wherein the second account is a different account than the first account;
      storing data associated with the second account that flags the second account to be invaded by one or more computer-controlled characters,
   selecting, a new ability that is different from the abilities of the particular computer-controlled character;
   after the second account has been flagged to be invaded by the one or more computer-controlled characters, detecting an invasion condition in a second game instance;
   wherein the second game instance includes second one or more player characters that are controllable by the second account;
   in response to detecting the invasion condition, performing the steps of:
      generating the one or more computer-controlled characters in the second game instance based on a location within the second game instance associated with the second one or more player characters,
      wherein generating the one or more computer-controlled characters includes:
         generating a second particular computer-controlled character of the one or more computer-controlled characters with the new ability;
         wherein, with the new ability, the second computer-controlled character to is able to perform a second set of actions;
         wherein the second set of actions includes a new action that is different than any action in the first set of actions available to the particular computer-controlled character in the first game instance;
         wherein, in the second game instance, the new ability enables the second particular computer-controlled character to use the new action when interacting with the second one or more player characters;
   wherein the method is performed by one or more computing devices.

2. The method of claim 1, wherein the first game instance is the second game instance.

3. The method of claim 1, wherein the particular event is the one or more player characters being defeated by the particular computer-controlled character.

4. The method of claim 3, further comprising:
   detecting that the particular event occurs by at least determining whether the particular computer-controlled character is a member of a set of computer-controlled characters for which invasions are enabled.

5. The method of claim 3, wherein at least one computer-controlled character of the one or more computer-controlled characters is a different character type than the particular computer-controlled character.

6. The method of claim 1, wherein the data associated with the second account includes character data related to the first one or more player characters and at least a portion of the one or more computer-controlled characters are generated based on the character data.

7. The method of claim 6, wherein at least one character of the one or more computer-controlled characters is presented with a model representing one or more characteristics of the first one or more player characters.

8. The method of claim 1, further comprising:
   in response to detecting that the second one or more player characters have defeated the one or more computer-controlled characters, performing one or more of: (a) generating a reward for the second account, (b) generating a reward for the first account, or (c) sending a message for the first account that informs the first account that the one or more computer-controlled characters have been defeated.

9. The method of claim 1, wherein the invasion condition is based on one or more of:
   (a) the second one or more player characters being within a particular location of a game world,
   (b) the second account not being invaded for a particular period of time, or
   (c) the second one or more player characters being engaged with one or more other characters.

10. The method of claim 1, wherein selecting the second account from the one or more accounts is based on one or more of: (a) a friends list associated with the first account that identifies the one or more accounts, (b) a time associated with each account of the one or more accounts that identifies when the account was last invaded, (c) a guild membership of the first account, or (d) which accounts of the one or more accounts are currently connected to an active instance of a game world.

11. The method of claim 1, wherein the one or more computer-controlled characters are scaled based on one or more characteristics of the second one or more player characters.

12. The method of claim 1, further comprising:
    in response to detecting that the one or more computer-controlled characters have defeated the second one or more player characters, selecting a third account from a second one or more accounts;
    storing second data associated with the third account that flags the third account to be invaded by second one or more computer-controlled characters that include the one or more computer-controlled characters;
    in response to detecting a second invasion condition involving a third one or more player characters that are controllable by the third account, generating the second one or more computer-controlled characters based on a second location associated with the third one or more player characters.

13. The method of claim 12, further comprising:
    selecting a second new action, wherein the second new action differs from any action of the first set of actions and the second set of actions, and the second computer-controlled character is generated with a third set of actions to use during encounters with the third one or more player characters that includes the second new action.

14. A non-transitory computer-readable storage medium storing one or more instructions which, when executed by one or more processors, cause the one or more processors to perform steps comprising:
    detecting that a particular event has occurred within a first game instance;
    wherein the particular event involves:
       first one or more player characters that are controllable by a first account, and
       a particular computer-controlled character,
    wherein the particular computer-controlled character has abilities that enable the particular computer-controlled character to perform a first set of actions when interacting with the first one or more player characters in the first game instance;
    in response to detecting that the particular event has occurred, performing steps of:
       selecting a second account from one or more accounts, wherein the second account is a different account than the first account;
       storing data associated with the second account that flags the second account to be invaded by one or more computer-controlled characters,
       selecting, a new ability that is different from the abilities of the particular computer-controlled character;
    after the second account has been flagged to be invaded by the one or more computer-controlled characters, detecting an invasion condition in a second game instance;
    wherein the second game instance includes second one or more player characters that are controllable by the second account;
    in response to detecting the invasion condition, performing the steps of:
       generating the one or more computer-controlled characters in the second game instance based on a location within the second game instance associated with the second one or more player characters,
       wherein generating the one or more computer-controlled characters includes:
          generating a second particular computer-controlled character of the one or more computer-controlled characters with the new ability;
          wherein, with the new ability, the second computer-controlled character to is able to perform a second set of actions;
          wherein the second set of actions includes a new action that is different than any action in the first set of actions available to the particular computer-controlled character in the first game instance;
          wherein, in the second game instance, the new ability enables the second particular computer-controlled character to use the new action when interacting with the second one or more player characters.

15. The non-transitory computer-readable storage medium of claim 14, wherein the first game instance is the second game instance.

16. The non-transitory computer-readable storage medium of claim 14, wherein the particular event is the one or more player characters being defeated by the particular computer-controlled character.

17. The non-transitory computer-readable storage medium of claim 16, wherein the steps further comprise:
    detecting that the particular event occurs by at least determining whether the particular computer-controlled character is a member of a set of computer-controlled characters for which invasions are enabled.

18. The non-transitory computer-readable storage medium of claim 16, wherein at least one computer-controlled character of the one or more computer-controlled characters is a different character type than the particular computer-controlled character.

19. The non-transitory computer-readable storage medium of claim 14, wherein the data associated with the second account includes character data related to the first one or more player characters and at least a portion of the one or more computer-controlled characters are generated based on the character data.

20. The non-transitory computer-readable storage medium of claim 14, wherein at least one character of the one or more computer-controlled characters is presented with a model representing one or more characteristics of the first one or more player characters.

21. The non-transitory computer-readable storage medium of claim 14, wherein the steps further comprise:
    in response to detecting that the second one or more player characters have defeated the one or more computer-controlled characters, performing one or more of: (a) generating a reward for the second account, (b) generating a reward for the first account, or (c) sending a message for the first account that informs the first account that the one or more computer-controlled characters have been defeated.

22. The non-transitory computer-readable storage medium of claim 14, wherein the invasion condition is based on one or more of:
   (a) the second one or more player characters being within a particular location of a game world,
   (b) the second account not being invaded for a particular period of time, or
   (c) the second one or more player characters being engaged with one or more other characters.

23. The non-transitory computer-readable storage medium of claim 14, wherein selecting the second account from the one or more accounts is based on one or more of: (a) a friends list associated with the first account that identifies the one or more accounts, (b) a time associated with each account of the one or more accounts that identifies when the account was last invaded, (c) a guild membership of the first account, or (d) which accounts of the one or more accounts are currently connected to an active instance of a game world.

24. The non-transitory computer-readable storage medium of claim 14, wherein the one or more computer-controlled characters are scaled based on one or more characteristics of the second one or more player characters.

25. The non-transitory computer-readable storage medium of claim 14, wherein the steps further comprise:
   in response to detecting that the one or more computer-controlled characters have defeated the second one or more player characters, selecting a third account from a second one or more accounts;
   storing second data associated with the third account that flags the third account to be invaded by second one or more computer-controlled characters that include the one or more computer-controlled characters;
   in response to detecting a second invasion condition involving a third one or more player characters that are controllable by the third account, generating the second one or more computer-controlled characters based on a second location associated with the third one or more player characters.

26. The non-transitory computer-readable storage medium of claim 25, wherein the steps further comprise:
   selecting a second new action, wherein the second new action differs from any action of the first set of actions and the second set of actions, and the second computer-controlled character is generated with a third set of actions to use during encounters with the third one or more player characters that includes the second new action.

\* \* \* \* \*